（12） United States Patent
Nomura

(10) Patent No.: US 8,711,431 B2
(45) Date of Patent: Apr. 29, 2014

(54) IMAGE FORMING APPARATUS ACQUIRING IMAGE PROCESSING TIME DETECTED WHEN THE ACQUIRED TIME IS LONGER THAT THE PREVIOUSLY SET TIME AND TO CORRECT OUTPUT IMAGE DENSITY USING GENERATED PATCH PATTERN

(75) Inventor: Yoshihisa Nomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 13/325,845

(22) Filed: Dec. 14, 2011

(65) Prior Publication Data

US 2012/0154836 A1 Jun. 21, 2012

(30) Foreign Application Priority Data

Dec. 20, 2010 (JP) ................................. 2010-283778

(51) Int. Cl.
*G06K 1/00* (2006.01)
*G03G 15/00* (2006.01)
*B41J 2/01* (2006.01)

(52) U.S. Cl.
USPC ................ 358/1.9; 358/504; 399/46; 399/49; 399/66; 347/15; 347/103

(58) Field of Classification Search
None
See application file for complete search history.

(56) References Cited

U.S. PATENT DOCUMENTS

| 7,583,408 | B2* | 9/2009 | Maeda et al. | 358/1.9 |
| 7,596,339 | B2* | 9/2009 | Kawase et al. | 399/110 |
| 7,619,791 | B2* | 11/2009 | Itoyama et al. | 358/504 |
| 8,045,874 | B2* | 10/2011 | Yoshida et al. | 399/49 |
| 2007/0036575 | A1* | 2/2007 | Hamano et al. | 399/82 |
| 2009/0161133 | A1* | 6/2009 | Nakamura | 358/1.9 |

FOREIGN PATENT DOCUMENTS

JP 2009-237036 A 10/2009

* cited by examiner

*Primary Examiner* — Steven Kau
(74) *Attorney, Agent, or Firm* — Canon USA, Inc. IP Division

(57) ABSTRACT

An apparatus includes: a transfer unit configured to transfer recording agent onto a transfer sheet to print input data; an acquisition unit configured to acquire, when the transfer unit transfers and when it is detected that processing is to be performed due to which time is extended that is taken from ending processing on the transfer sheet to starting the processing on a following transfer sheet, the time generated due to performance of the detected processing; a generation unit configured to generate, when the acquired time is longer than a previously set time, a patch pattern on the transfer sheet; and a correction unit configured to correct output image density using the generated patch pattern.

9 Claims, 13 Drawing Sheets

FIG. 7

| JOB_ID | PAGE NUMBER | ESTIMATED TIME [msec] | PAGE SIZE | MEDIA | SPECIAL IMAGE PROCESSING | FINISHER PROCESSING |
|---|---|---|---|---|---|---|
| 1 | 1 | 2000 | A4 | PLAIN PAPER | | |
| | 2 | 400 | A4 | PLAIN PAPER | | |
| | 3 | 400 | A4 | PLAIN PAPER | | |
| | 4 | 400 | A3 | PLAIN PAPER | | |
| | 5 | 3000 | A4 | THICK PAPER | MONOCHROME | |
| | 6 | 400 | A4 | PLAIN PAPER | | |
| | 7 | 400 | A4 | PLAIN PAPER | | |
| | 8 | 1000 | A4 | PLAIN PAPER | ROTATION, RESOLUTION CONVERSION | |
| | 9 | 400 | A4 | PLAIN PAPER | | |
| | 10 | 400 | A4 | PLAIN PAPER | | |
| | 11 | 400 | A4 | PLAIN PAPER | | |
| | 12 | 400 | A4 | PLAIN PAPER | | |
| | 13 | 400 | A4 | PLAIN PAPER | | |
| | 14 | 400 | A4 | PLAIN PAPER | | |
| | 15 | 400 | A4 | PLAIN PAPER | | |
| | 16 | 4000 | A4 | PLAIN PAPER | | STAPLE, BOOKBINDING |
| 2 | 1 | 400 | A4 | PLAIN PAPER | | |
| | 2 | 400 | A4 | PLAIN PAPER | | |
| | 3 | 400 | A4 | PLAIN PAPER | | |
| | 4 | 1500 | A4 | PLAIN PAPER | | BLANK PAPER INSERTION |
| | 5 | 400 | A4 | PLAIN PAPER | | |
| | 6 | 400 | A4 | PLAIN PAPER | | |
| | 7 | 400 | A4 | PLAIN PAPER | | |
| | 8 | 400 | A4 | PLAIN PAPER | | |

FIG. 9

| CURRENT PAGE ESTIMATED TIME[msec] | NEXT ITEM ESTIMATED TIME[msec] | FIXING ROLLER TEMPERATURE ADJUSTMENT | MEDIA DECK CHANGE |
|---|---|---|---|
| 0 | 31000 | NONE | TO BE PERFORMED IN NEXT ITEM |

FIG. 10

| CURRENT PAGE ESTIMATED TIME [msec] | NEXT ITEM ESTIMATED TIME [msec] | FIXING ROLLER TEMPERATURE ADJUSTMENT | MEDIA DECK CHANGE |
|---|---|---|---|
| 8000 | 0 | IN OPERATION | NONE |

IMAGE FORMING APPARATUS ACQUIRING IMAGE PROCESSING TIME DETECTED WHEN THE ACQUIRED TIME IS LONGER THAT THE PREVIOUSLY SET TIME AND TO CORRECT OUTPUT IMAGE DENSITY USING GENERATED PATCH PATTERN

BACKGROUND OF THE INVENTION

1. Field of the Invention

The present invention relates to an image processing apparatus including a density correction unit.

2. Description of the Related Art

As an image recording method used for an image processing apparatus such as a printer or a copy machine, an electro-photographic method is known. The electro-photographic method forms a latent image on a photosensitive drum using a laser beam, and then develops the latent image with charged recording agent (herebelow, referred to as "toner"). A toner image formed with the developed toner is transferred and fixed onto a transfer sheet to record an image thereon.

In this image processing apparatus, after warming up for activation, a specific patch pattern such as a gradation pattern is printed on a recording material such as a sheet. A method is known in which an image reading device such as a scanner reads the above-described patch pattern and gives read information to an image forming condition as feedback so that stability of image quality can be improved. Further, by using the image processing apparatus for a long period of time, an adhesion characteristic of developing tonner to a potential of a photosensitive drum is changed and, as a result, an optimum image forming condition may not be ensured. Therefore, correction is conventionally performed using a relationship between potential data and density.

Furthermore, as the toner image, a plurality of patch patterns on which halftone processing is performed in the apparatus at a predetermined density level are formed on an intermediate transfer member, and then a sensor included in the apparatus measures the density of the patch patterns. Based on the measurement result, a density characteristic of the halftone processing with respect to an input density level is calculated, and then a density correction table is generated so that the input density level of print data has a predetermined standard density value. Subsequently, the input density level of the print data is corrected according to the density correction table. With this correction, colors and the density of an output image are always maintained within a certain region according to an input density level.

In the image processing apparatus of the electro-photographic method, particularly in a quick printing industry, the density correction unit as described above is demanded to further improve density stability. Thus, the number of patch patterns corresponding to the gradation and image formation has being increased to improve the density stability. That is because, for example, the patch patterns are generated that correspond to the increasing number of gradations from a low density level to a high density level, and formation of each image of a low line screen, a high line screen, and error diffusion.

On the other hand, a head-to-sheet distance (between transfer sheet and transfer sheet in continuous pages) is narrowed to improve productivity of the image processing apparatus, so that a non-image forming region on the intermediate transfer member is decreased. Due to the causes described above, the number of patch patterns that can be generated in the non-image forming region is decreased.

Therefore, to ensure the non-image forming region necessary for the number of the patch patterns, the narrowed head-to-sheet distance is widened, or the patch patterns are not collectively generated in one location but generated over a plurality of pages to perform the density correction.

However, extending the time may lower productivity, in other words, extending a time taken from ending the processing on a certain transfer sheet to starting the processing on a following transfer sheet decrease the productivity. Further, generating patch pattern over the plurality of pages, which is the latter case, may deteriorate accuracy of the density stability, since feeding back and reflecting a correction result takes time.

To address such a problem, a technique discussed in Japanese Patent Application Laid-Open No. 2009-237036 controls an exposure unit and a development unit so that a solid image for correction is formed in the non-image region passing an exposure position when a plane phase of a rotating polygonal mirror is corrected. According to the technique, the productivity is prevented from being lowered while a correction operation for stabilizing image quality is performed.

However, according to Japanese Patent Application Laid-Open No. 2009-237036, if the rotating polygonal mirror is not corrected, the problem in which performance is lowered due to the density correction is not fully solved.

Although a system for controlling a timing in which a controller of the conventional image processing apparatus generates the patch pattern can estimate generation of the time sufficient for generating the patch pattern during performing a job, the patch pattern is not generated by efficiently using the time.

The time herein specifically refers to a time for processing of covers, inserting sheets, staples in a procedure of book binding processing, and a time for performing rendering processing in a processing of controller side.

Further, the time is generated due to time related to drum cleaning processing and fixing-roller-temperature adjusting processing performed by an image forming unit. Since the image processing unit and the image forming unit perform in a nonsynchronous manner with each other, the controller may not be able to previously estimate the processing by the image forming unit. Even in such a case, the controller does not calculate the time generated due to the processing by the image forming unit. Therefore, the time is not efficiently used.

Furthermore, even when the time is generated due to the processing performed by either of the image processing unit or the image forming unit, although the patch pattern could be generated and the density correction processing could be performed using the time, the time is not efficiently used.

SUMMARY OF THE INVENTION

According to an aspect of the present invention, an apparatus includes: a transfer unit configured to transfer recording agent onto a transfer sheet to print input data; an acquisition unit configured to acquire, when the transfer unit transfers and when it is detected that processing is to be performed due to which the time is extended that is taken from ending processing on the transfer sheet to starting the processing on a following transfer sheet, the time generated due to performance of the detected processing; a generation unit configured to generate, when the acquired time is longer than a previously set time, a patch pattern on the transfer sheet; and a correction unit configured to correct output image density using the generated patch pattern.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a table of estimated page processing times.

FIG. 9 is a table of estimated image-forming-unit processing times.

FIG. 10 is a table of estimated image-forming-unit processing times.

DESCRIPTION OF THE EMBODIMENTS

Various exemplary embodiments, features, and aspects of the invention will be described in detail below with reference to the drawings.

Figure 4:
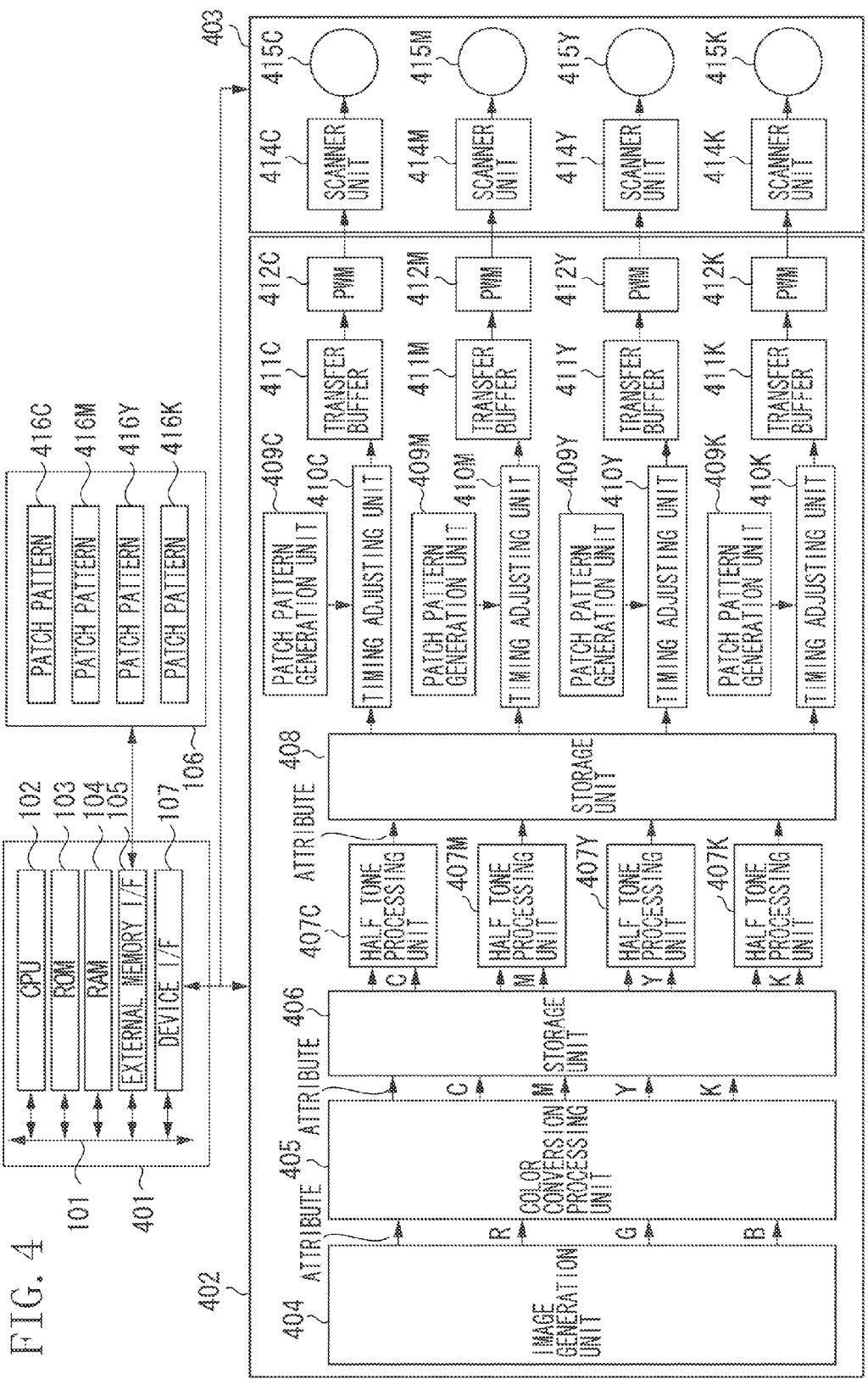
FIG. 4 illustrates a configuration of each block related to generating an electrostatic latent image.

Herebelow, a exemplary embodiment for conducting the present invention will be described with reference to drawings. FIG. 4 illustrates a configuration of each block related to generation of an electrostatic latent image in a color image processing apparatus of an electro-photographic method according to a first exemplary embodiment. The color image processing apparatus includes a main controller 401, an image processing unit 402, and an image forming unit 403. The image processing unit 402 generates bitmap image information, based on which, the image forming unit 403 forms an image on a recording medium.

The main controller 401 is connected to a scanner (not illustrated) that is an image input device and the image forming unit 403 that is an image output device. On the other hand, the main controller 401 is connected to a network such as a local area network (LAN) (not illustrated) and a public line to input and output image information and device information.

A system bus 101 includes a high-speed bus such as a protocol control information (PCI) bus or an IEEE 1394. FIG. 4 illustrates only devices related to the present exemplary embodiment. The system bus 101 is connected to a network connection interface (I/F) and a scanner I/F that are necessary for a multifunction peripheral (MFP) (not illustrated).

A central processing unit (CPU) 102 functions as a controller that controls an overall color image processing apparatus. A random access memory (RAM) 104 is a system work memory for operating the CPU 102 and used as an image memory for temporary storing image data. A read only memory (ROM) 103 is used as a boot ROM and stores a boot program of the color image processing apparatus.

An external memory interface (I/F) 105 is a I/F for an external memory such as hard disk (HDD), and data stored in an external storage unit 106 or an external storage device (not illustrated) can be read or written via the external memory I/F 105. The external storage unit 106 is an external memory of the HDD, a double data rate (DDR) 3 memory, and a NAND-type flash memory. Further, the external storage unit 106 stores a patch pattern necessary for the present exemplary embodiment, in addition to system software, the image data, and personal data such as an address book. A device I/F 107 can communicate with the image processing unit 402 and the image forming unit 403 to issue a print execution command, transfer the image data, and read an engine status.

Next, processing performed by the image processing unit 402 of the color image processing apparatus will be described. An image generation unit 404 generates raster image data on which print processing can be performed from print data received from a computer apparatus (not illustrated), and then outputs the raster image data for each pixel as red, green, black (RGB) data and attribute data indicating data attribute. The image generation unit 404 may process not the image data received from the computer apparatus but the image data from a reading unit included in the color image forming device. The reading unit referred to herein includes at least a charged couple device (CCD) or a contact image sensor (CIS). The reading unit may also include a processing unit that performs a predetermined image processing on the read image data. Further, the color image processing apparatus may not include the reading unit but may receive the data therefrom via an interface (not illustrated).

A color conversion unit 405 converts the RGB data into cyan, magenta, yellow, black (CMYK) data corresponding to a toner color that is recording agent used by the image forming unit 403, and then stores the CMYK data and the attribute data in a storage unit 406. The storage unit 406 is a first storage unit included in the image processing unit 402 and once stores the raster image data on which the print processing is to be performed. The storage unit 406 may include a page memory storing the image data for one page or a band memory storing the data for a plurality of lines.

Halftone processing units 407C, 407M, 407Y, 407K perform γ correction and halftone processing on the attribute data and the data of each color output from the storage unit 406. The γ correction performs density correction to calibrate the data to an ideal gradation characteristic. Specifically, the halftone processing unit performs screen processing or error diffusion processing. The screen processing performs N-valuing using a plurality of predetermined dither matrixes and the input image data. The error diffusion processing performs the N-valuing by comparing the input image data with a predetermined threshold value and the difference between the input image data and the threshold value is diffused to surrounding pixels on which the N-valuing processing is to be subsequently performed.

A second storage unit 408 included in the image processing apparatus stores N-valued data processed by the halftone processing unit 407 (407C, 407M, 407Y, 407K).

Patch pattern generation units 409C, 409M, 409Y, 409K of respective colors generate the patch pattern that needs the density correction, and then transfer the patch pattern to a transfer buffer described below. The patch pattern is generated from the read screen patterns that are acquired by selecting an optimum patch pattern from the main controller 401 and previously stored in the external storage unit 106. Alternatively, the patch pattern is generated by internal logic.

Timing adjusting units 410C, 410M, 410Y and 410K synchronize an output timing of the N-valued data from the storage unit 408 and the data of the patch pattern generation unit 409 with an operation of the image forming unit 403.

Transfer buffers 411C, 411M, 411Y and 411K temporarily retain the output data from the timing adjustment unit 410.

A pulse width modulation (PWM) 412 converts a pulse width of the image data for each color output by a transfer buffer 411 into an exposure time of scanner units 414C, 414M, 414Y, 414K. Subsequently, the image data having the converted width modulation is output by print units 415C, 415M, 415Y, 415K of the image forming unit 403.

Patch patterns 416C, 416M, 416Y, 416K are used for the density correction. Pattern types corresponding to the number of gradations and the halftone processing performed by the halftone processing units 407C, 407M, 407Y, 407K are prepared on the external storage unit 106. The pattern types are read by the patch pattern generation units 409C, 409M, 409Y, 409K of the image processing unit 402 via the device I/F 107.

The external storage unit 106, the first storage unit 406, the second storage unit 408 and the transfer buffer 411 are described as being separately configured herein, however, they may be configured as a common storage unit inside or outside the image processing apparatus.

The image forming unit 403 drives exposing light according to an exposure time processed by the image processing unit 402, forms an electrostatic latent image, and then develops the electrostatic latent image to form a monochromatic toner image. The monochromatic toner images are superimposed to form a multi-color toner image. The multi-color toner image is transferred onto a recording medium 11, and then fixed thereon.

Figure 5:
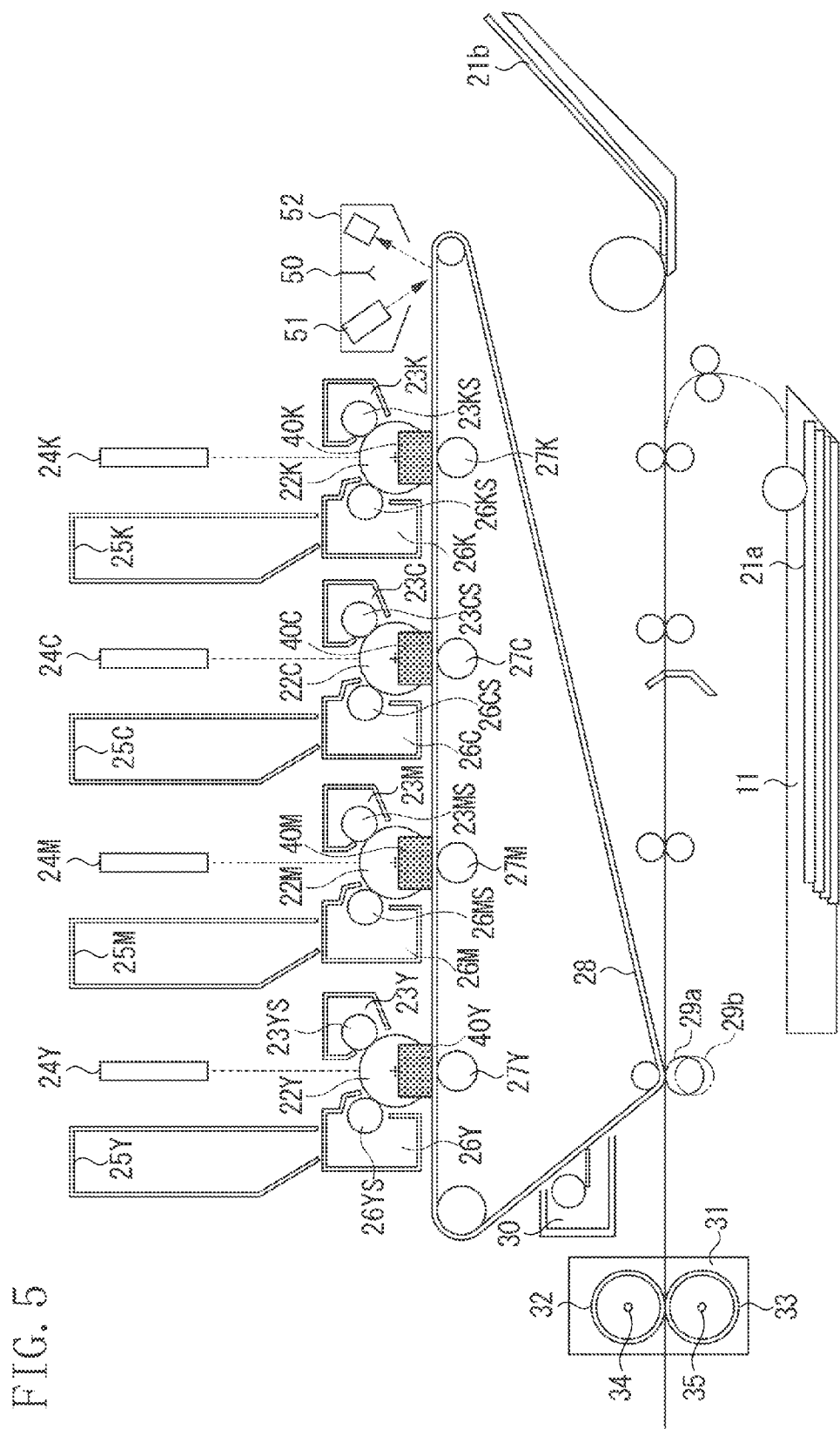
FIG. 5 is a cross-sectional view of an image processing apparatus.

FIG. 5 is a cross-sectional view of the color image processing apparatus to be used in the present exemplary embodiment that is an example of the color image processing apparatus of the electro-photographic method and adopts an intermediate transfer member 28. With reference to FIG. 5, an operation of the image forming unit 403 in the color image processing apparatus of the electro-photographic method will be described.

A charge unit includes four injection charging devices 23Y, 23M, 23C, 23K for charging photosensitive members 22Y, 22M, 22C, 22K for each color of Y, M, C, K, and each injection charging device includes sleeves 23YS, 23MS, 23CS, 23KS respectively.

The photosensitive members 22Y, 22M, 22C, 22K rotates when driving forces of driving motors 40Y, 40M, 40C, 40K are transmitted, and the driving motors rotates the photosensitive members 22Y, 22M, 22C, 22K in a counterclockwise direction corresponding to an image forming operation. An exposure unit emits exposure light from the scanner units 24Y, 24M, 24C, 24K to the photosensitive members 22Y, 22M, 22C, 22K respectively. By selectively exposing surfaces of the photosensitive members 22Y, 22M, 22C, 22K, the electrostatic latent image is formed. At this point, each of the scanner units 24Y, 24M, 24C, 24K includes a multi-laser beam that can emit a plurality of exposure light beams.

The development unit includes four development units 26Y, 26M, 26C, 26K that develop each respective color Y, M, C, K to visualize the formed electrostatic latent image. Each development unit includes each of sleeves 26YS, 26MS, 26CS, 26KS. Each development unit 26 can be detached/attached.

The transfer unit rotates the intermediate transfer member 28 in a clockwise direction to transfer the monochromatic toner image onto the intermediate transfer member 28 from the photosensitive drum 22. The monochromatic toner image is transferred along with rotations of the photosensitive members 22Y, 22M, 22C, 22K and the first transfer rollers 27Y, 27M, 27C, 27K that are located opposing the photosensitive members. An appropriate bias voltage is applied to the first transfer roller 27, and a rotation speed of the photosensitive drum 22 is differentiated from that of the intermediate transfer member 28 to efficiently transfer the monochromatic toner image onto the intermediate transfer member 28, which is referred to as a first transfer.

Further, the transfer unit superimpose the monochromatic toner image onto the intermediate transfer member 28 at each station, and then the superimposed multi-color toner image is conveyed to a second transfer roller 29 along with the rotation of the intermediate transfer member 28.

Further, the recording medium 11 is held and conveyed from a paper feeding tray 21 to the second transfer roller 29, and the multi-color toner image on the intermediate transfer member 28 is transferred onto the recording medium 11. An appropriate bias voltage is applied to the second transfer roller 29, and then the toner image is electrostatically transferred, which is referred to as second transfer. The second transfer roller 29 abuts on the recording medium 11 at a position 29a while the multi-color toner image is transferred onto the recording medium 11, and separates away to a position 29b after the print processing.

A fixing unit includes a fixing roller 32 for heating the recording medium 11 and a pressure roller 33 for press-contacting the recording medium 11 to a fixing roller 32 to melt and fix, onto the recording medium 11, the multi-color toner image transferred onto the recording medium 11. The fixing roller 32 and the pressure roller 33 are formed in a hollow state to build heaters 34, 35 therein respectively. A fixing device 31 conveys the recording medium 11 retaining the multi-color toner image with the fixing roller 32 and the pressure roller 33 and applies heat and pressure to the recording medium 11 to fix the toner onto the recording medium 11.

The recording medium 11 after the toner is fixed thereon is subsequently discharged to a paper discharge tray (not illustrated) by a discharge roller (not illustrated), and ends the image forming operation. A cleaning unit 30 cleans remaining toner on the intermediate transfer member 28. Waist toner remaining after the multi-color toner image having four colors formed on the intermediate transfer member 28 has been transferred onto the recording medium 11 is stored in a cleaner container.

Figure 2:
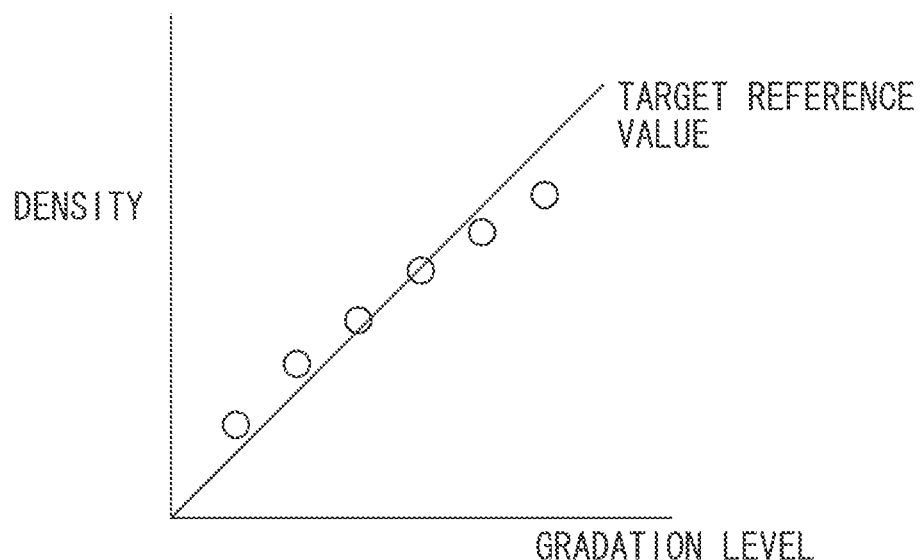
FIG. 2 is a graph illustrating a change of toner density in density correction processing.
Figure 3:
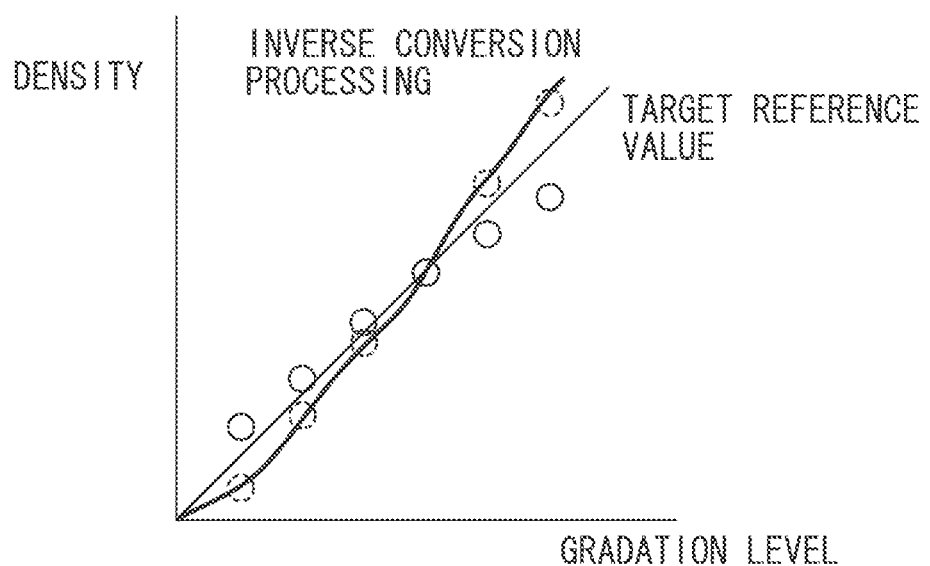
FIG. 3 is a graph illustrating inverse-conversion-processing results in density correction processing.

The density correction unit converts the toner image on the intermediate transfer member 28 into an electric signal by a photo sensor 50 including a light emitting diode (LED) 51 and a photo diode 52. After the electric signal has been analog to digital (A/D) converted, the electric signal is transmitted to the CPU 102 of the controller via the device I/F 107. FIG. 2 illustrates a change of toner image density read from the output patch pattern. The CPU 102 adds a characteristic of the apparatus acquired from an amount of change between a received density value and a target density value to perform an inverse conversion processing such that output image density corresponds to the image signal in a linear relationship. FIG. 3 illustrates a result of performing linear correction on the density value plotted by the inverse conversion processing. A γ look up table (LUT) stored an inside is corrected to have the density values plotted by the inverse conversion processing illustrated in FIG. 3. The target density value is generated in advance when an initialization sequence is conducted after the power is turned on, or when the density is corrected after a predetermined time has elapsed.

Figure 1:
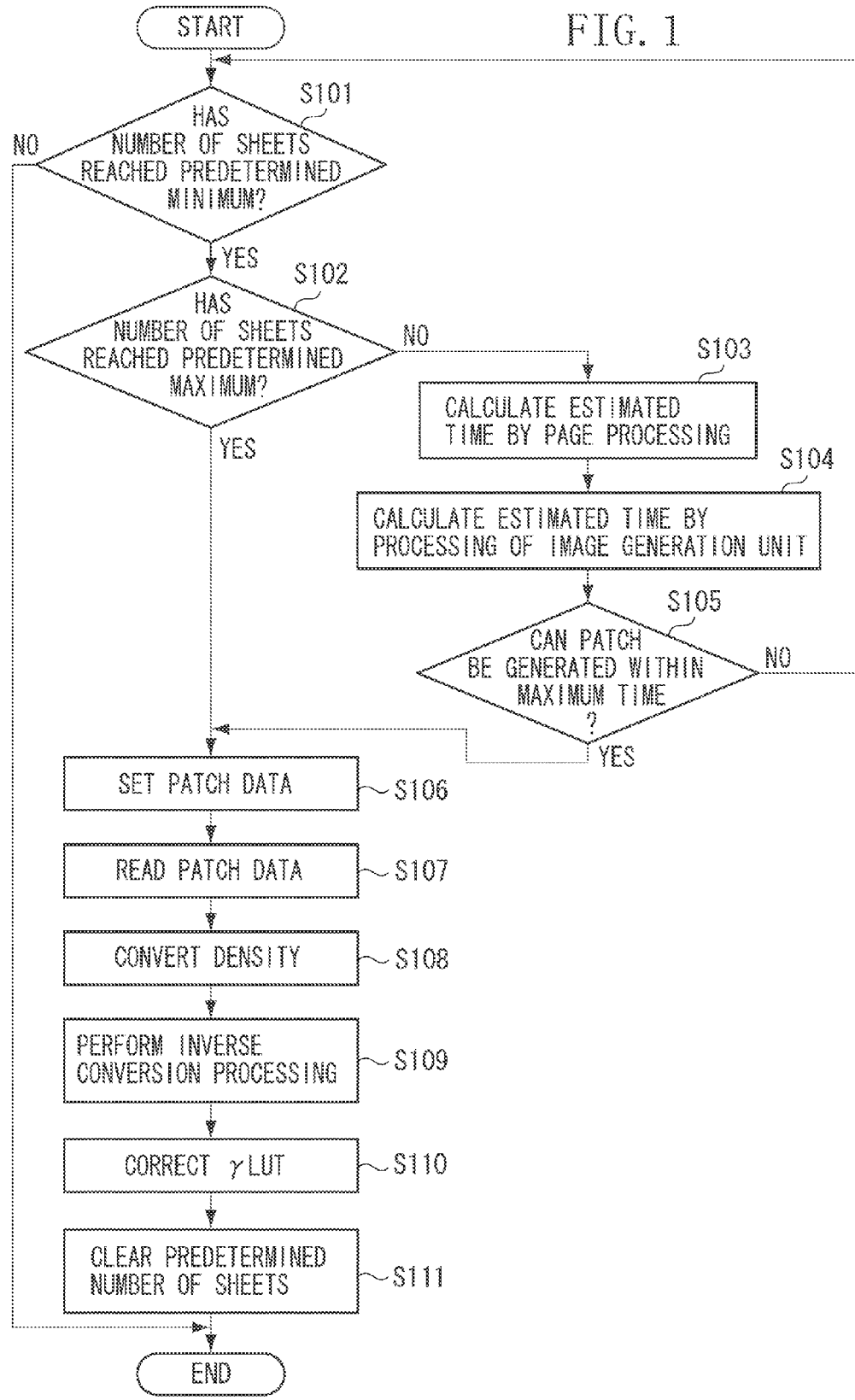
FIG. 1 is a main flowchart.

The first exemplary embodiment will be described. With reference to the flowchart illustrated in FIG. 1, a flow will be described in which the estimated time is acquired and the patch pattern for correcting the density is generated, and then the density correction processing is performed in the system described above as an example. The estimated time herein refers to a time necessary for processing of covers, inserting sheets, staples in a procedure of book binding processing, or a time necessary for drum cleaning processing and fixing-roller-temperature adjusting processing performed by the image forming unit. In the density correction processing, a program on the RAM on the main controller 401 controls a processing flow.

Upon start of the print processing, the processing proceeds to step S101 to start the density correction processing flow.

In step S101, for the storage unit including the RAM 104 and a register of the HDD, the CPU 102 previously sets the maximum value and the minimum value of a specified number of sheets on which the density correction is performed. Further, separately, the CPU 102 reads a page counter value managed by the storage unit of the RAM 104 or the register of the HDD to determine whether the number of sheets reaches the minimum value of the set specified number of sheets. When reaching (YES in step S101), the CPU 102 proceeds to step S102. When not reaching (NO in step S101), after the page processing described above ends, the CPU 102 proceeds to step S101 again.

In step S102, the CPU 102 determines whether the number of sheets reaches the maximum value of the set specified number of sheets.

The specified number of sheets is set, and the CPU 102 does not proceed a processing until the set number. This is because, a sufficient effect cannot be acquired if the calibration is performed when a small number of page processing is finished. Therefore, when the number of sheets reaches the specified number (YES in step S102), the CPU 102 proceeds to step S106, and when not reaching (NO in step S102), the CPU 102 proceeds to step S103.

In step S103, the CPU 102 takes the time generated due to the page processing, in other words, the CPU 102 estimates the time taken from ending the processing on a certain transfer sheet to starting the processing on a following transfer sheet. More specifically, the CPU 102 acquires the estimated time. The flowchart described below will describe more details. The CPU 102 proceeds to step S104.

In step S104, the CPU 102 acquires the estimated time to be generated due to the processing by the image forming unit.

Next, the CPU 102 proceeds to step S105.

In step S105, the CPU 102 acquires the estimated maximum time from the estimated times calculated in steps S103 and S104. The CPU 102 determines whether, within either of the estimated maximum times described above, it is possible to generate the number of patch patterns necessary for the density correction processing to be performed in the time. In this case, the time for generating the number of necessary patch patterns is previously determined, and its information is stored in the apparatus.

When it is possible (YES in step S105), the CPU 102 proceeds to step S106. When it is not possible (NO in step S105), the CPU 102 returns to step S101.

In step S106, the CPU 102 sets the generation of the patch pattern on the patch pattern generation units 409C, 409M, 409Y, 409K to generate the patch pattern to be added in the maximum time acquired in step S105. In this setting, the pattern types corresponding to the color of the patch pattern on which the density correction is to be performed, the gradation, and the halftone processing are selected corresponding to content performed in a previous correction processing. Further, the CPU 102 performs setting on the timing adjusting units 410C, 410M, 410Y, 410K to perform an output aligning coordinates of the patch pattern to be added to a sensor position in a main scanning direction and the head-to-sheet distance in a sub scanning direction. With the settings described above, when the patch pattern is generated in the estimated time of the current page, the patch pattern generated before the page processing of the current page is output from the main controller 401, and then the toner image is formed on the intermediate transfer member 28. On the other hand, when the patch pattern is generated in the estimated maximum time between a current page and a following page, after the image of the current page is formed, the patch pattern is output to form the toner image on the intermediate transfer member 28. Subsequently, the CPU 102 proceeds to step S107.

In step S107, a photosensor 50 A/D-converts a signal value acquired by reading the toner image formed in step S104, and then transmits the converted signal value to the CPU 102 of the main controller 401 via the device I/F 107. Subsequently, the CPU 102 proceeds to step S108.

In step S108, the CPU 102 converts the signal value received from the photosensor 50 into the density. The CPU 102 herein extracts the density value from the signal value read by the sensor at the coordinate position set in step S106. As illustrated in FIG. 2, the density values herein are plotted for each of the color, the gradation, and the pattern type corresponding to the halftone processing of the patch pattern added in step S106, and then the CPU 102 proceeds to step S109.

In step S109, from amounts of changes of the density value extracted in step S108 and the target density value, the CPU 102 adds the characteristic of the apparatus and performs the inverse conversion processing so that the output image density linearly corresponds to the image signal (density characteristic of the target) as illustrated FIG. 3, and then the CPU 102 proceeds to step S110.

In step S110, the setting in which the correction value inverse-converted in step S109 is reflected to the LUT in the halftone processing unit 407 is added, and then the CPU 102 proceeds to step S111. In step S112, a page counter indicating the specified number of sheets on which the density correction is to be performed is cleared.

Figure 6:
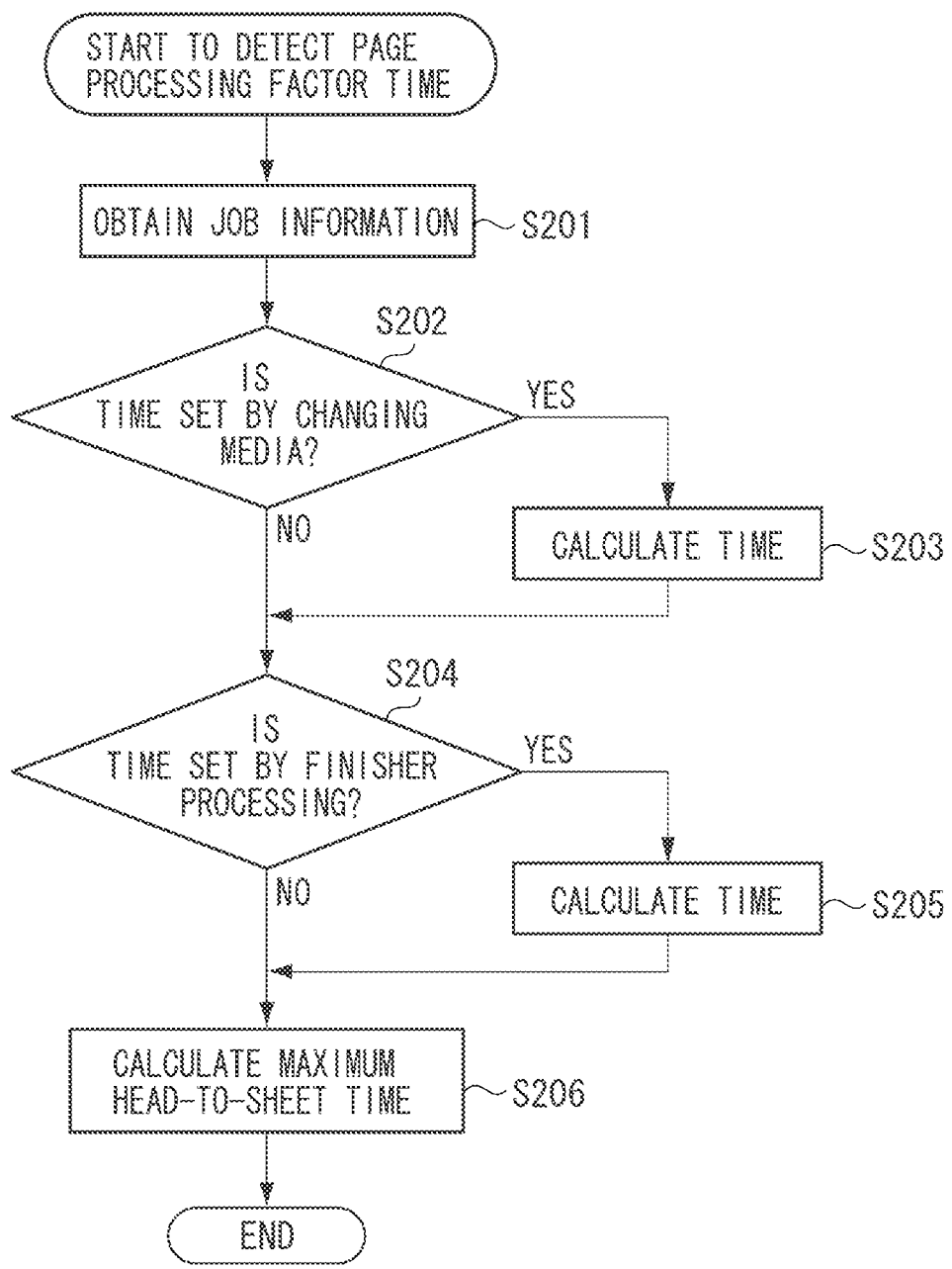
FIG. 6 is a flowchart illustrating acquiring a time generated due to page processing.

Next, a flow for acquiring the time generated due to the processing performed by the controller when the page processing is performed in step S103 will be described with reference to a flowchart illustrated in FIG. 6.

In step S201, the CPU 102 acquires job information that is currently loaded. As content of the job information, JOB_ID, a page size, a media type to be used, special image processing, and content of finisher processing on a previous page are previously described on a chart as illustrated in FIG. 7. Thus, by acquiring the content, timing for performing the processing with the controller can be previously detected.

With reference to FIG. 7, the estimated time taken from ending the transfer processing on the current page to starting the transfer processing on the following page is calculated according to the flow described below. The calculated, estimated times are stored as a table of estimated page processing times that is generated on the RAM 104. When the estimated time is acquired, the processing time for each processing is previously set on a program. When each processing is performed in series, each result is acquired, and when the processing is performed in parallel, the maximum value of the results is acquired.

In step S202, the CPU 102 determines whether to perform media change processing on the processing target page. When performing (YES in step S202), the CPU102 proceeds to step S203. When not performing (NO in step S202), the processing proceeds to step S204.

In step S203, the CPU 102 acquires the time generated due to the processing in step S202. For example, in FIG. 7, processing for changing regular paper to thick paper is performed on page 5 of JOB_ID=1. Therefore, since a waiting time due to changing a fixing temperature at an engine side is generated, it is estimated that 3,000 msec of the time is generated. By the result acquired as described above, the table of estimated page processing times is updated. Subsequently, the CPU 102 proceeds to step S204.

In step S204, the CPU 102 determines whether to perform the finisher processing on an output material on whose previous page a printed output target is printed. When performing (YES in step S204), the CPU 102 proceeds to step S205. When not performing (NO in step S204), the CPU 102 proceeds to step S206.

In step S205, the CPU 102 acquires the time generated due to the processing in step S204. For example, in FIG. 7, on page 1 of JOB_ID=2, staple processing and bookbinding processing for page 16 of JOB_ID=1 that is a previous page are performed. Thus, it is estimated that 4,000 msec of the time is generated. By the result acquired as described above, the table of estimated page processing times is updated. Subsequently, the CPU 102 proceeds to S206.

In step S206, the CPU 102 calculates the maximum time from among the estimated times calculated in steps S203 and S205, and updates the table of estimated page processing times. Even when the time is extended that is generated due to the page processing that is not described in the above-described flow, similarly the extension is reflected to the estimated time.

Figure 8:
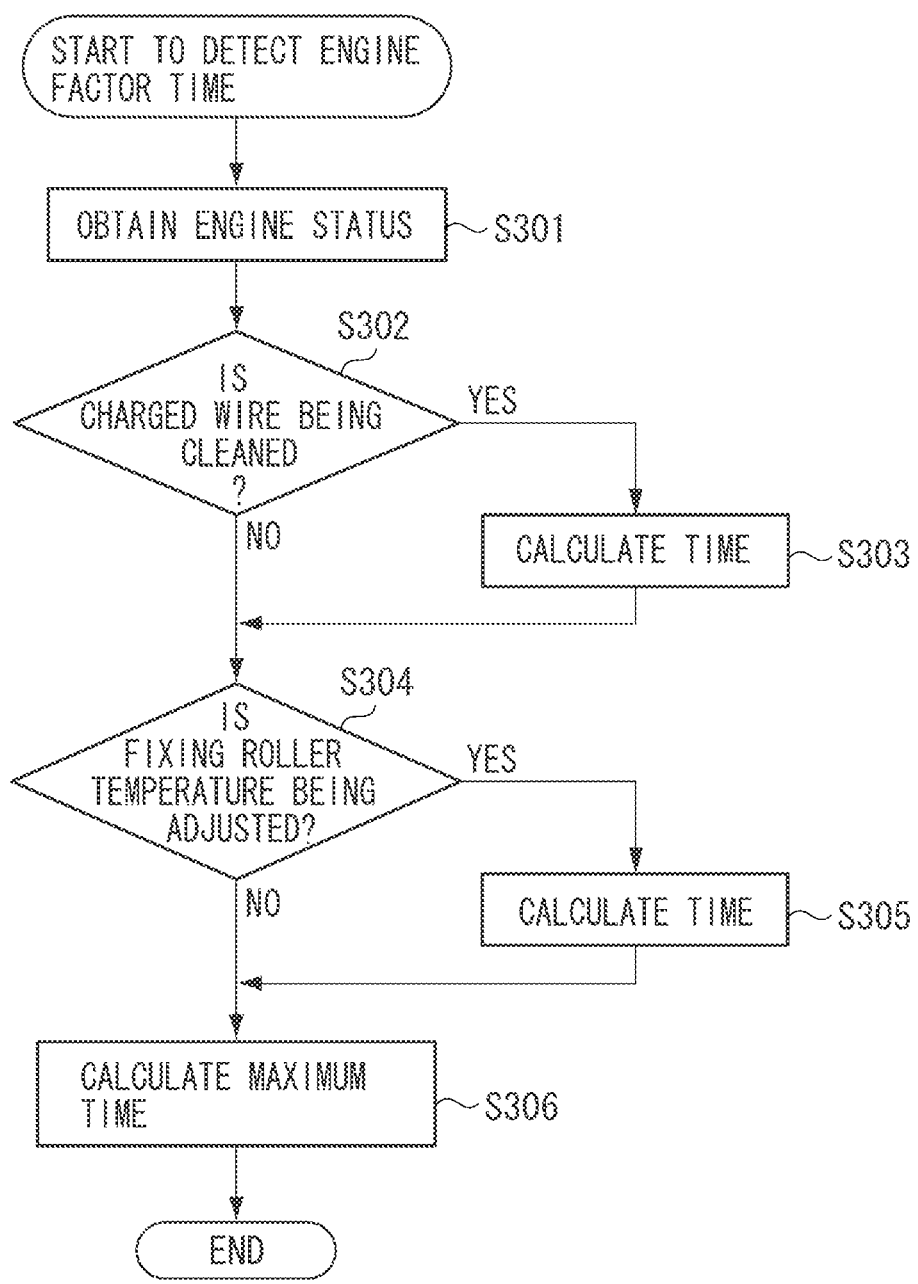
FIG. 8 is a flowchart illustrating acquiring a time generated due to an image forming unit.

Next, a flow for acquiring the time generated due to the processing performed by the image forming unit will be described with reference to a flowchart illustrated in FIG. 8. Some timings for performing the processing by the image forming unit can be previously detected when the job is performed, and others cannot be detected.

The processing whose performance timing can be previously detected is periodically performed with timing set for the processing or the apparatus for performing the page processing. More specifically, for example, the processing includes media-deck-change processing for changing the regular paper to coat paper and drum cleaning processing.

On the other hand, the processing whose performance timing cannot be previously detected is performed when a certain circumstance state occurs or when conditions are accidentally provided. More specifically, for example, the processing includes the fixing-roller-temperature adjusting processing.

Figure 11:
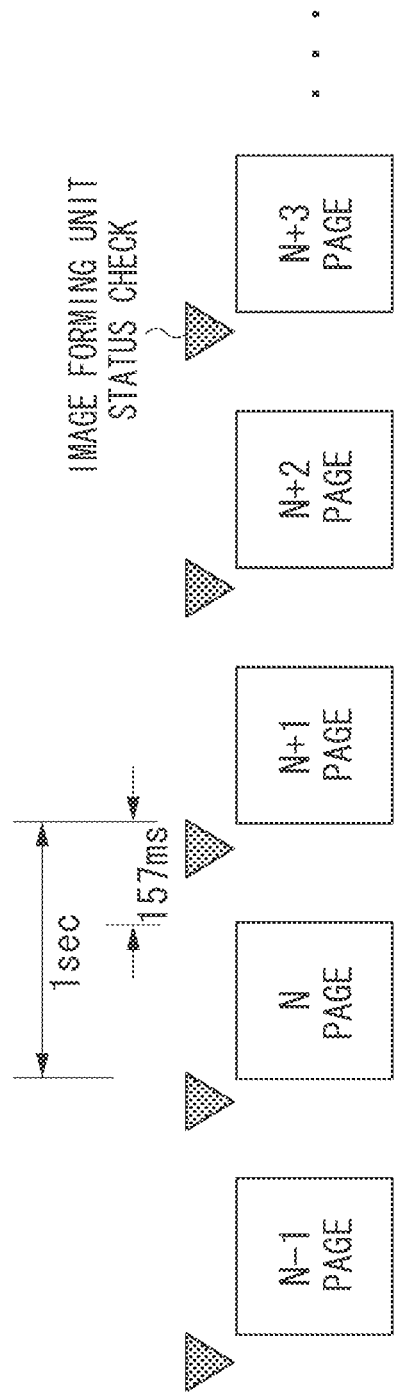
FIG. 11 illustrates timings for checking a status of an image forming unit.

To detect the performance of the processing whose performance timing cannot be previously detected, as illustrated in FIG. 11, the status of the image forming unit is periodically checked. However, since the periodical check is only performed every page interval time (every 1 sec when 60 ppm), the CPU cannot know about the details of the timing for starting the processing.

Figure 12:
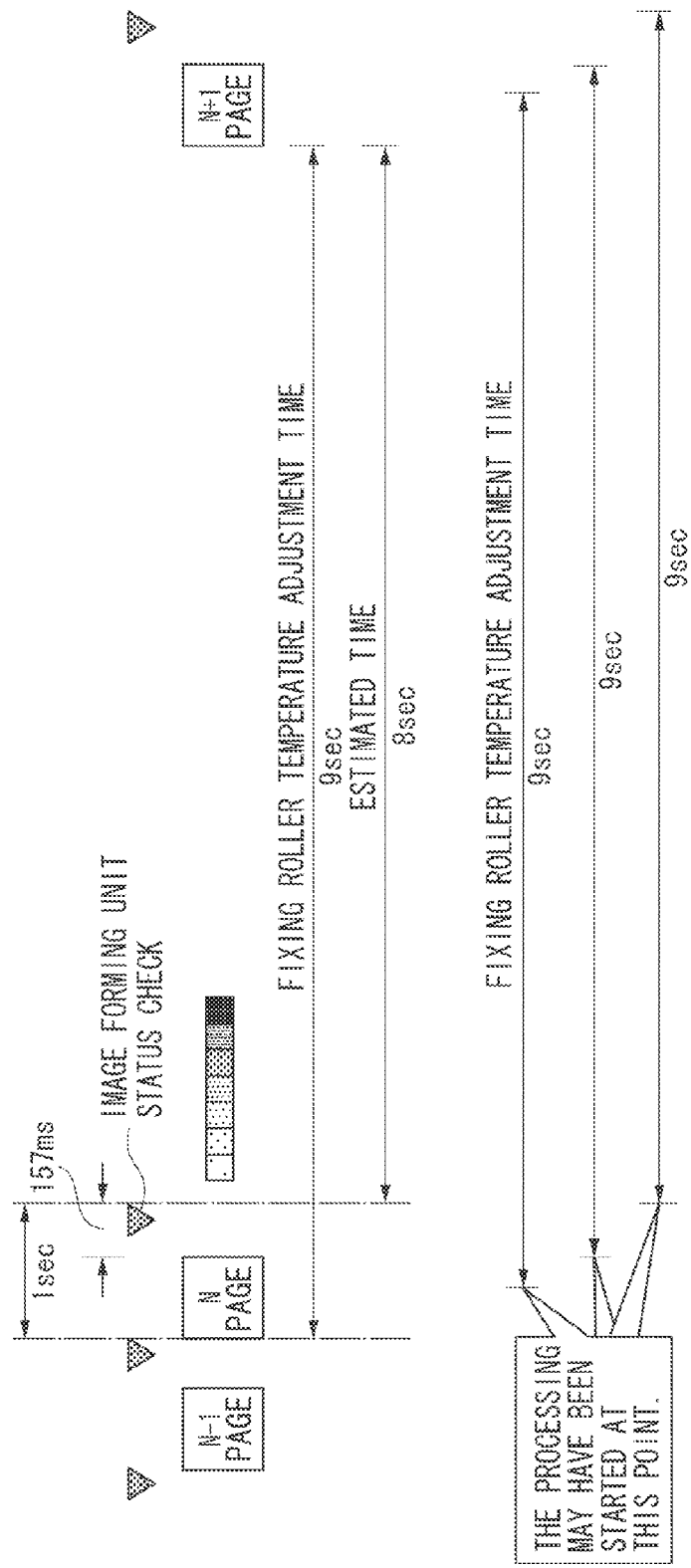
FIG. 12 illustrates timings for checking a status of an image forming unit.

Therefore, in this case, to calculate the detailed estimated time, as illustrated in FIG. 12, if it is detected that certain processing is performed when checking the status, it is estimated that the processing has started right after the status of the one previous page has been checked, and then the estimated time is acquired (specific example will be described below).

In step S301, the CPU 102 acquires the status of the image forming unit via the device I/F 107. Herein, the status of the image forming unit is managed as illustrated in FIG. 9. The estimated time from a state where the media-deck-change processing and the fixing-roller-temperature adjusting processing are performed by the image forming unit to a state where the image forming processing is capable of being performed after it has ended on the previous page is managed by the table acquired according to the flow described below. The table is retained in the RAM 104 of the main controller 401 and referred to, and updated by acquiring information about the image forming unit by the CPU 102 when print processing is started or when interruption is notified. When the status of the image forming unit is acquired, the CPU 102 proceeds to step S302.

In step S302, the CPU 102 determines whether the media-deck-change processing is to be performed or being performed by the image forming unit, from the status of the image forming unit acquired in step S301. As a result of determination, when the media-deck-change processing is to be performed or being performed (YES in step S302), the CPU 102 proceeds to step S303. In other cases (NO in step S302), the CPU 102 proceeds to step S304.

In step S303, the CPU 102 acquires the time generated due to the processing performed in step S302. For example, when the time is acquired referring to the table as illustrated in FIG. 9, it can be known that the media-deck-change processing is to be performed between the current page in processing and the following page. Accordingly, it is known that 31,000 msec of the time is taken due to the processing. By the result acquired as described above, a table of estimated image-forming-unit processing times is updated, and then the CPU 102 proceeds to step S304.

In step S304, the CPU 102 determines whether the fixing-roller-temperature adjusting processing is to be performed or being performed by the image forming unit from the status of the image forming unit acquired in step S301. As a result of determination, when the fixing-roller-temperature adjusting processing is to be performed or being performed (YES in step S304), the CPU 102 proceeds to step S305. In other cases (NO in step S304), the CPU 102 proceeds to step S306.

In step S305, the CPU 102 acquires the time generated due to the processing performed in step S304. For example, when the time is acquired referring to the table as illustrated in FIG. 10, at this point, it can be known that the status indicates that the fixing-roller-temperature adjusting processing is already being performed. As described above, the fixing-roller-temperature adjusting processing is one of the processing whose performance timing cannot be previously detected. Thus, to detect the start of the performance timing of the processing, the details will be described with reference to FIG. 12. As illustrated in FIG. 12, the fixing-roller-temperature adjusting processing takes 9,000 msec and the print processing takes 1,000 msec for one page herein. Although the fixing-roller-temperature adjusting processing may be started with the timing illustrated in FIG. 12, the processing is assumed to be started at one previous page here. A processing time taken for one page is subtracted from a time taken by the fixing-roller-temperature adjusting processing, and then it can be known that the time takes 8,000 msec. By a result acquired as described above, the table of estimated image-forming-unit processing times is updated. Subsequently, the CPU102 proceeds to step S306.

In step S306, the CPU 102 acquires the maximum time from among the estimated times acquired in steps S303 and S305, and updates the table of estimated image-forming-unit processing times.

Even when the time is extended due to the processing performed by the image forming unit that is not described in the above-described flow, similarly, the extension is reflected to the estimated time.

By the flow described above, the estimated time is calculated and the patch pattern for correcting the density is generated on the intermediate transfer belt to perform the density correction processing using the calculated time, so that the productivity of the apparatus can be improved.

A case where the correction processing is performed by the conventional method and a case where the correction processing is performed by the method of the present invention will be described, and specific effects according to the present exemplary embodiment will be also described.

For example, as illustrated in FIG. 11, it is assumed that a print speed of the image processing apparatus to be used is 60 ppm (60 sheets in one minute), and the time when print is performed on the normal A4 plain paper is 157 msec.

Timing for correcting the density is set to 80 sheets as the minimum value of the specified number of sheets according to the first exemplary embodiment and 100 sheets as the maximum value thereof. On the other hand, the conventional specified number of the sheets is set to 100 sheets. Herein, the page processing occurs after the 98th page has been processed, and the time necessary for performing the page processing takes 31 seconds.

Further, seven patch patterns for correcting the density are formed, which takes 1.05 seconds considering a processing speed.

Figure 13:
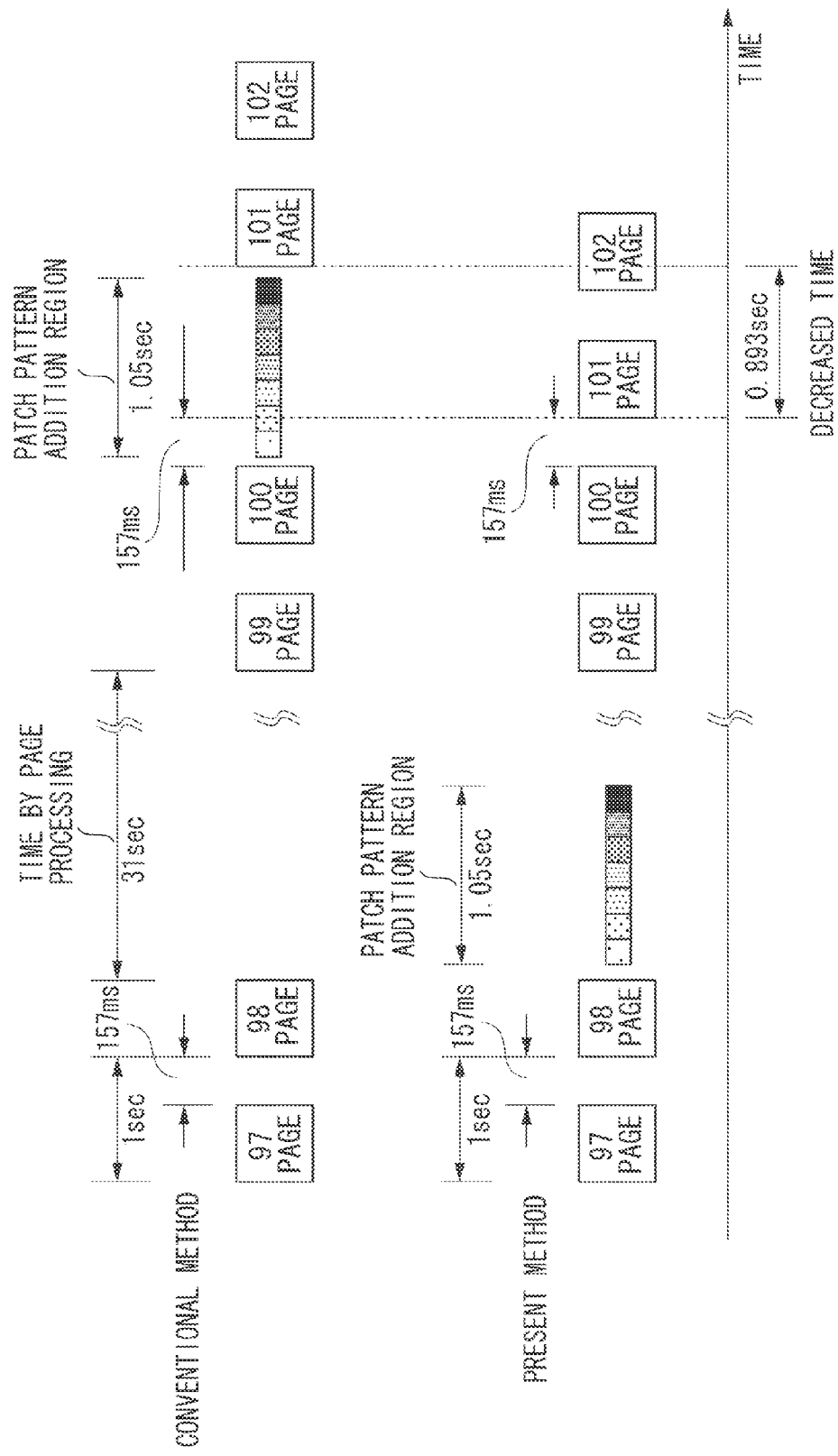
FIG. 13 is a diagram in which density correction processing according to the present exemplary embodiment is compared with the conventional method.

When the page processing is performed after the 98th page has been processed as illustrated in FIG. 13, since the number of sheets does not reach the 100 sheets that is the specified number of sheets to perform the density correction by the conventional method, the patch pattern is not generated in the time generated due to this page processing.

On the other hand, according to the present exemplary embodiment, the number of sheets has a value between the minimum value and the maximum value that are the specified number of sheets for performing the density correction, and it is estimated that the page processing takes 31 seconds to be performed. Thus, it is determined that, after the 98th page has been processed, the patch pattern can be added. Subsequently, the patch pattern generation unit is set for generating the patch pattern. The density is detected from the generated patch pattern and the density correction processing is performed. Subsequently, the counter for checking the specified number of sheets for performing the density correction processing is cleared.

Subsequently, when the 100th page is processed, since the specified number of sheets that is the timing for performing the density correction reaches the 100th sheets according to the conventional method, similarly to the above-described method, the density correction processing is performed. Thus, performing the density correction processing takes 1.05 sec.

On the other hand, according to the present exemplary embodiment, since the counter is cleared after the density correction has been performed in the time after the $98^{th}$ page has been processed, after $100^{th}$ page is processed, the specified number of sheets for performing the density correction does not reach the minimum value. Thus, the density correction is not performed.

In this case, compared with the conventional method, 0.893 sec can be decreased according to the present exemplary embodiment. Further, using the present exemplary embodiment, when a great amount of job is loaded, by decreasing the time in each processing, the effects of improving the productivity can be expected.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-283778 filed Dec. 20, 2010, which is hereby incorporated by reference herein in its entirety.

What is claimed is:

1. An apparatus comprising:
   a transfer unit configured to transfer recording agent onto a transfer sheet to print input data;
   an acquisition unit configured to acquire, when the transfer unit transfers and when it is detected that processing is to be performed due to which time is extended that is taken from ending processing on the transfer sheet to starting the processing on a following transfer sheet, the time generated due to performance of the detected processing;
   a generation unit configured to generate, when the acquired time is longer than a previously set time, a patch pattern on the transfer sheet; and
   a correction unit configured to correct output image density using the generated patch pattern.

2. The apparatus according to claim 1,
   wherein the processing due to which the time is extended is, when the input data is printed, performed by a processing unit; and
   wherein the acquisition unit is configured to acquire a time for performing the processing from information added to the input data.

3. The apparatus according to claim 1,
   wherein the processing due to which the time is extended is, when the input data is printed, performed by a forming unit; and
   wherein, to detect timing for performing the processing, a status of the forming unit is periodically checked.

4. A method comprising:
   transferring recording agent onto a transfer sheet to print input data;
   acquiring, when transferring and when it is detected that processing is to be performed due to which time is extended that is taken from ending processing on the transfer sheet to starting the processing on a following transfer sheet, the time generated due to performance of the detected processing;

generating, when the acquired time is longer than a previously set time, a patch pattern on the transfer sheet; and correcting output image density using the generated patch pattern.

5. The method according to claim 4, wherein the processing due to which the time is extended is, when the input data is printed, performed by a processing unit; and wherein the acquiring is configured to acquire a time for performing the processing from information added to the input data.

6. The method according to claim 4, wherein the processing due to which the time is extended is, when the input data is printed, performed by a forming unit; and wherein, to detect timing for performing the processing, a status of the forming unit is periodically checked.

7. A non-transitory computer-readable storage medium storing a computer program for causing a computer to execute the method according to claim 4.

8. The storage medium according to claim 7,

Wherein, the processing due to which the time is extended is, when the input data is printed, performed by a processing unit; and wherein the acquiring is configured to acquire a time for performing the processing from information added to the input data.

9. The storage medium according to claim 7, wherein the processing due to which the time is extended is, when the input data is printed, performed by a forming unit; and wherein, to detect timing for performing the processing, a status of the forming unit is periodically checked.

* * * * *